United States Patent

[11] 3,628,610

[72] Inventor James Morkoski
 Clarendon Hills, Ill.
[21] Appl. No. 820,752
[22] Filed May 1, 1969
[45] Patented Dec. 21, 1971
[73] Assignee International Harvester Company
 Chicago, Ill.

[54] DRAFT-SENSING MEANS FOR TRACTOR HITCHES
 11 Claims, 4 Drawing Figs.

[52] U.S. Cl. .................................................. 172/9, 172/7
[51] Int. Cl. .......................................... A01b 63/32
[50] Field of Search ............................................ 172/7, 9

[56] References Cited
 UNITED STATES PATENTS
 3,375,876 4/1968 Engelmann .................. 172/7 X
 3,520,369 7/1970 Nicholson .................... 172/7
 3,112,798 12/1963 Foxwell ........................ 172/7
 3,233,680 2/1966 Arzoian et al. ............... 172/7 X FOREIGN PATENTS
 258,286 1/1964 Australia
 1,274,553 9/1961 France
 950,566 2/1964 Great Britain
 1,016,612 1/1966 Great Britain

*Primary Examiner*—Clyde I. Coughenour
*Attorney*—Floyd B. Harman

ABSTRACT: For employment with a tractor having a hitch means, a power lift unit for vertically raising and lowering the hitch means on said tractor, actuating means for controlling the power lift unit in response to the draft load of an associated implement, an improved draft-sensing unit for measuring the draft load on said hitch means and for transferring a quantitative draft load signal to the actuating means, the improved sensing unit being incorporated into an element of the hitch and having resilient force-resisting means which will deflect proportionately to the force imposed upon said element and hydraulic measuring means for measuring the deflection of the resilient force resisting means and being interconnected with the power actuator unit for transmitting a quantitative signal of the force imposed on said element to the actuator unit.

Inventor:
James Morkoski

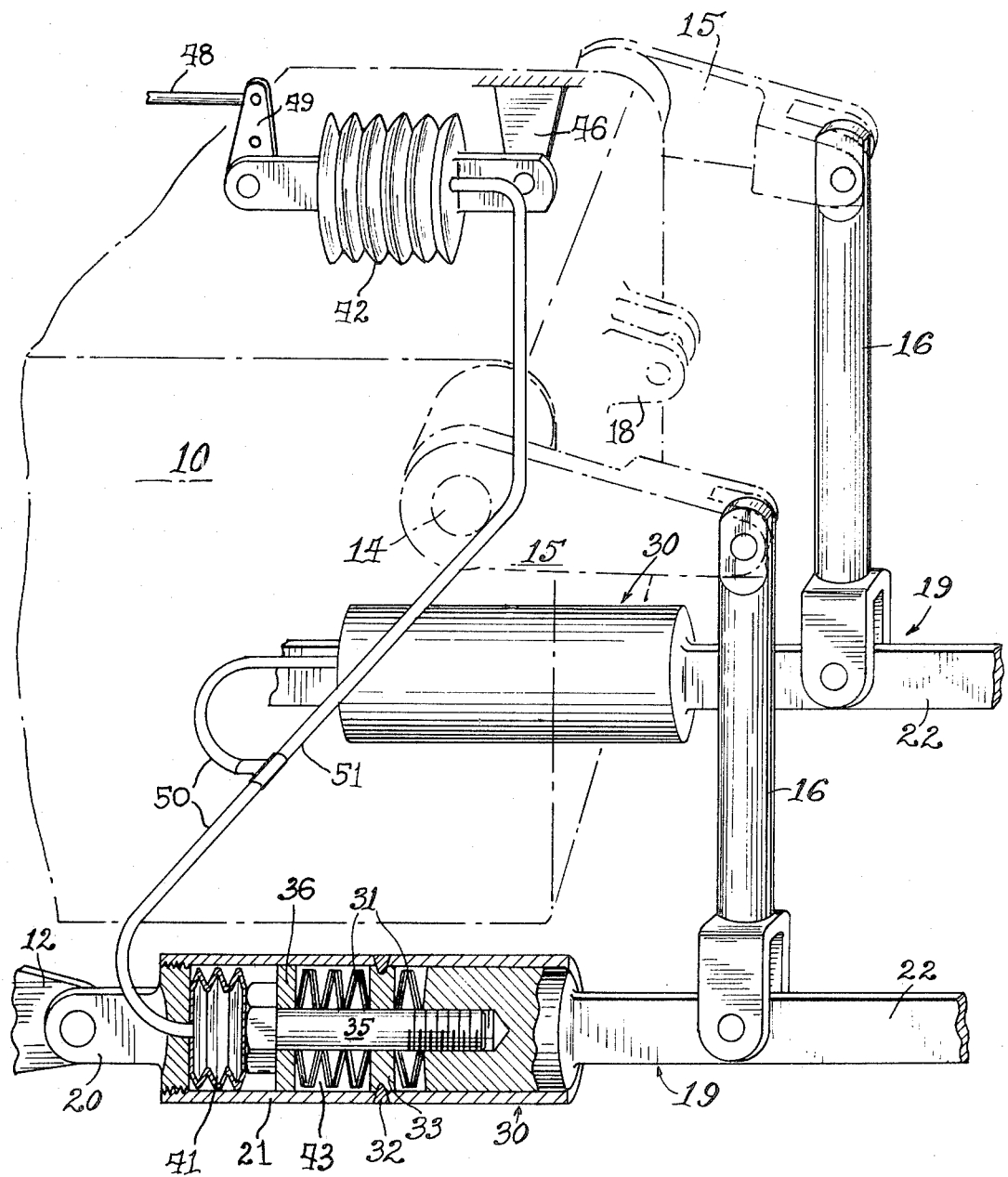

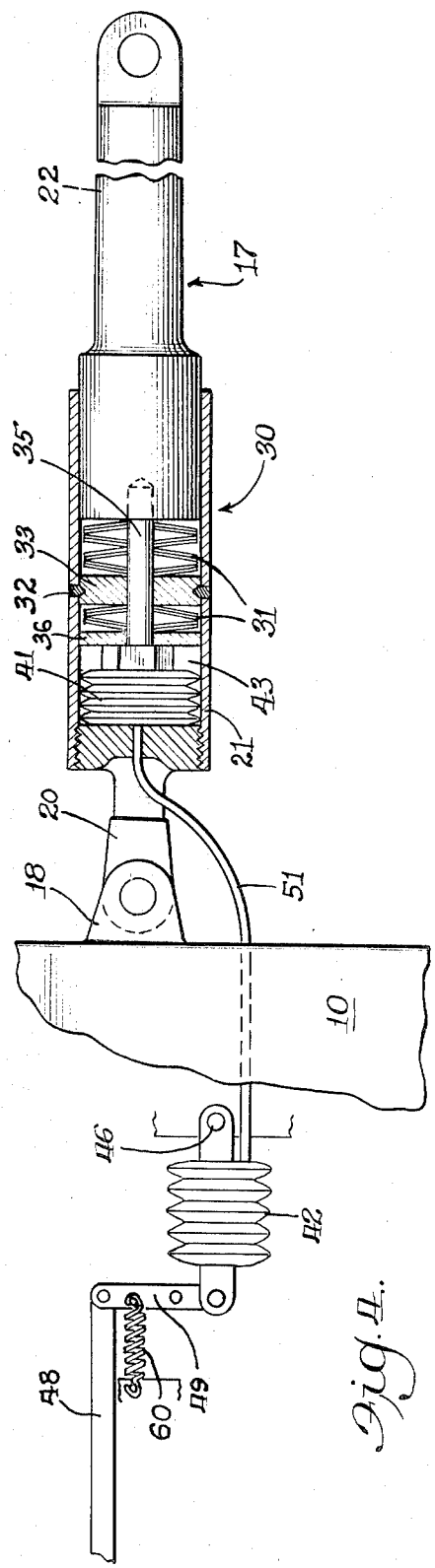
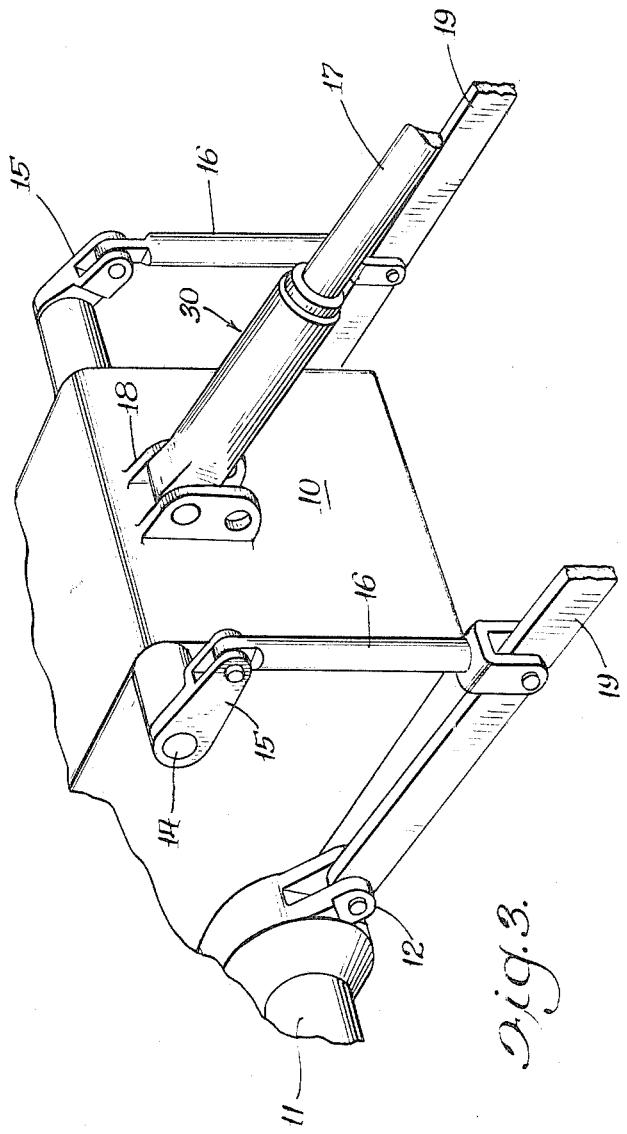

DRAFT-SENSING MEANS FOR TRACTOR HITCHES

BACKGROUND OF THE INVENTION

This invention relates to a sensing unit for an agricultural vehicle which is adapted to measure the forces imposed on said vehicle by an associated trail-behind device and to transmit a quantitative signal of the force to an actuating means which will in turn vertically alter the position of a hitch means of a tractor so as to maintain the draft forces substantially constant. Thus if the draft force imposed by said trail-behind device tends to increase, the sensing unit will transmit an increased quantitative signal to the actuating means so as to raise the hitch means and the associated implement such that the draft force will remain substantially constant. By thus altering the depth to which ground-engaging tools are operating, the draft force imposed upon the tractor will remain constant and preclude variations in the power output requirements of the tractor which might otherwise require shifting of the transmission to a higher or lower gear.

It is well known in the prior art to incorporate some type of draft-sensing unit into he tractor for broadly accomplishing the aforesaid purposes. Examples of such would include U.S. Pat. No. 3,241,620 issued to A. Brudnak, U.S. Pat. No. 2,940,530 issued to W. H. DuShane, and U.S. Pat. No. 2,437,875 issued to J. M. Chamber et al. However, the devices employed by the prior art, although accomplishing the broad purposes of a draft-sensing device, do not include several advantageous features which are desirable. For example all of the well-known draft-sensing devices are incorporated into the rear frame of the tractor and the draft force measurements are imposed thereon through an assortment of various linkages, fulcrums and lever arms. In transferring the draft force through theses linkages, frictional forces affect and distort measurement of the actual draft force imposed upon the tractor. Similarly, the prior art always incorporates the draft-sensing mechanism into the body of the tractor at a fixed position requiring the hitch elements to be attached to the tractor body at a given location in respect to the sensing mechanism. Thus the attaching point of the hitch elements to the tractor must always be in a specific relationship to the draft-sensing mechanism on the tractor frame and there is no means of obtaining the optimum hitch point when the tractor is operating in a furrow or of compensating for variable tire sizes which also affect the hitch point and ground relationship. Finally the prior art devices usually require costly machined parts which must further be composed of relatively exotic compositions so as to withstand the forces applied thereto.

SUMMARY OF THE INVENTION

The instant disclosure is directed to a draft-sensing mechanism which may be incorporated directly into the hitch elements of the tractor requiring little or no modification of the tractor frame itself. Thus at least one of the hitch elements is preferably a telescopic member, the telescoping parts forming an expandable and contractable chamber for housing a resilient means and a hydraulic actuator disposed adjacent thereto whereby the resilient means are deflected proportionately to the amount of force imposed upon the hitch element, and this deflection is conveyed to the power-actuating unit by a change in volume of the hydraulic actuator.

Thus it is an object of the instant invention to provide a draft-sensing device directly incorporated into an element of the hitch linkage whereby load measurements are made directly within the hitch element thereby alleviating frictional problems and the complexity of transmitting these forces through lever arms, fulcrums etc. Further it is an object of this invention to provide a draft-sensing unit incorporated into a hitch element whereby the hitch element may be attached to the tractor at one of several alternative points so as to obtain a proper virtual hitch point regardless of variable tire sizes. Another object is to provide a device which is extremely simple to manufacture and provide relatively inexpensive construction. In one of the preferred embodiments in which the sensing elements are provided in both of the lower links of the conventional three-point hitch-type tractor, the draft-sensing mechanism is capable of measuring the draft force imposed upon one link or a divided load applied to both links of the hitch element.

DESCRIPTION OF THE DRAWINGS

The manner in which the objects of the invention are obtained will be made clear by a consideration of the following specification and claims when taken in conjunction with the accompanying drawings in which;

FIG. 2 is a similar view with the rear housing of the tractor being shown in phantom while portions of the draft-sensing mechanism are broken away so as to provide a side elevational view to the center thereof;

FIG. 3 discloses a perspective view of the rear section of the tractor frame with the instant invention incorporated into the upper link element of the conventional three-point hitch; and FIG. 4 discloses a side elevational view of the draft-sensing device of FIG. 3 partially in section.

DETAIL DESCRIPTION

Figure 1:
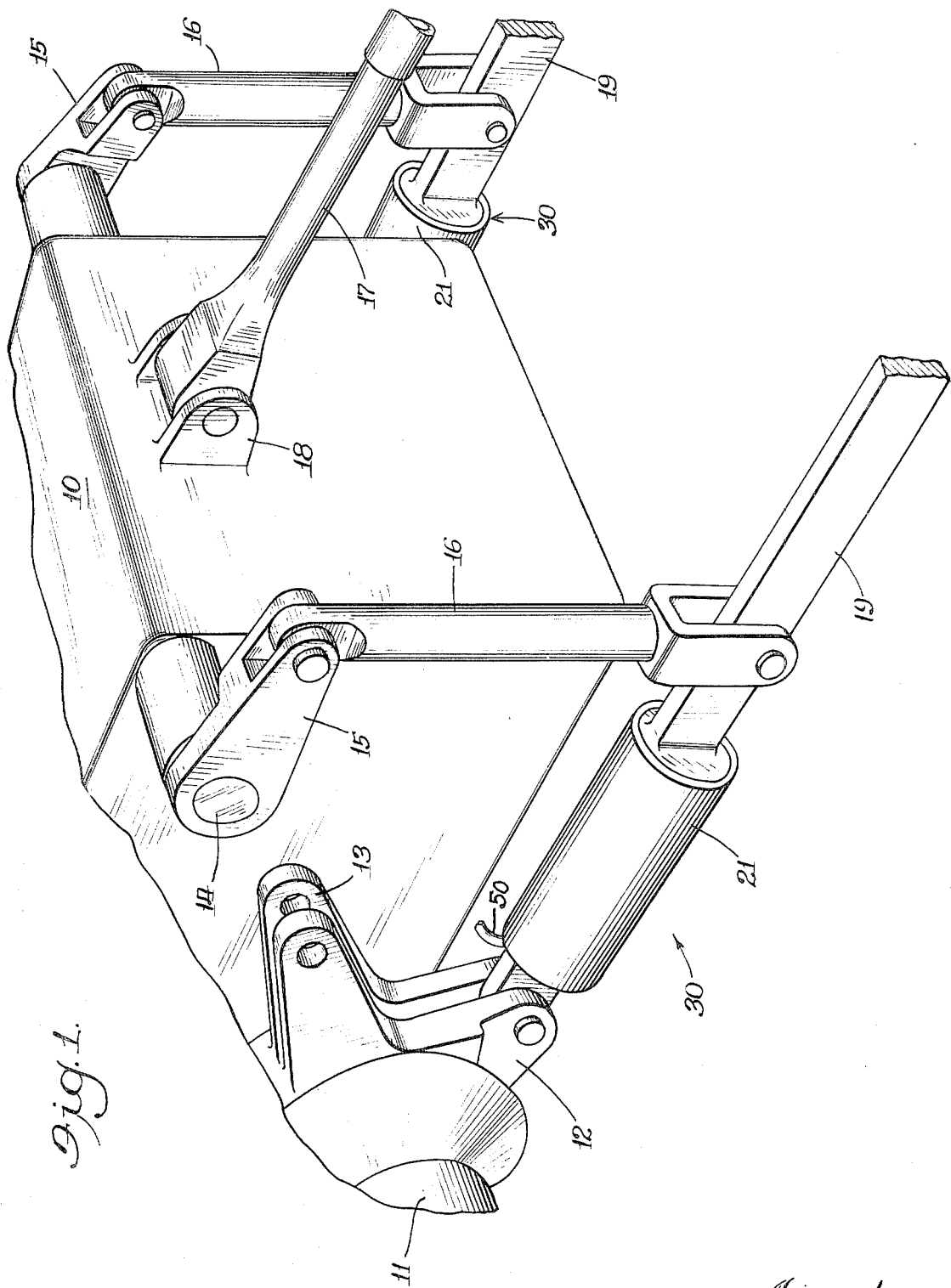
FIG. 1 is a perspective view of the rear frame of a tractor with the draft-sensing unit incorporated into the lower hitch elements of the conventional three-point hitch.

As disclosed in FIGS. 1 and 2 the rear frame 10 of the tractor which is supported by axles 11 and wheels (not shown) carries a conventional three-point hitch means comprised of an upper link 17 and two lower links 19, 19. As is well known in the art (and further disclosed in the above identified patents), the interior of the frame 10 conventionally carries a source of fluid energy which may be directed by an actuation unit to or from a power lift unit which controls rotation of a rockshaft 14. Thus as the power lift unit is actuated, the rockshaft 14 raises and lowers the three-point hitch elements by means of lift arms 15, 15 constrained for rotation with the rockshaft 14 through the drop links 16, 16. The upper link 17 attached to the tractor frame 10 by a coupler element 18 and to the conventional mast of the implement (not shown) merely follows the vertical disposition of the two lower links 19, 19 the latter being connected to the tractor rear frame by either a lower coupler 12 or an upper alternate coupler 13.

More specific to the instant invention the sensor unit 30 is incorporated into both of the lower link elements 19, 19 in the embodiments of FIGS. 1 and 2 only one unit disclosed in detail. Preferably this sensor unit may be contained in a chamber 43 formed by the telescopic configuration of the forward tubular element 21 over the rearward section 22 of link 19. The tubular or cylindrical element 21 is connected to the coupler element 12 of the rear frame 10 by a member 20 which is threaded to the cylinder 21 or attached thereto in any conventional manner. Suitably disposed within the cylindrical member 21 is an abutment 33 fixed in place by cotter elements 32 (or other suitable means) and having disposed upon either side thereof resilient means 31, preferably in the form of Belleville washers. A bolt 35 then passes through an abutting disk 36, the Belleville washers 31, the abutment 32 and threadedly engages the rear element 22 of lower link 19. Thus it will be appreciated that element 22 is capable of telescopic movement in either direction within the cylindrical member 21 subject only to the resistance afforded by the resilient means 31.

Disposed adjacent the head of the bolt 35 is signal-transmitting chamber 41 preferably in the form of a bellows unit which will expand and contract subject to deflection of any of the Belleville washers 31. The signal-transmitting chamber 41 of both sensor units 30, 30 are then connected by appropriate conduits 50 and 51 with a signal-receiving chamber 42 also in the form of a bellows unit the system being filled with fluid to form a hydraulic link. The unit 42 is suitably attached to the interior of rear frame 10 by an anchor 46 at its rearward end and operating upon a pivotable link 49 which is further attached by rod 48 to the spool of a valve or actuating means which controls fluid flow to and from the power lift unit. Thus assuming that each of the lower link elements 19, 19 have a tensile force imposed thereon by an associated trail-behind device, the sensor unit 30 will be caused to telescope outwardly thereby expanding the signal-transmitting chamber 41 which in turn will cause a contraction of signal-receiving member 42 due to the fluid flowing from bellows unit 42 to each of the bellows units 41, 41 in the sensor units 30. A spring as disclosed at 60 in FIG. 4 may be appropriate to provide a nominal pressure within the hydraulic link to insure proper response to changes in draft forces. Consequently as the signal-receiving chamber 42 contracts the rod member 48 is pushed forwardly so as to actuate a valve controlling fluid flow to or from the power lift unit. Although forming no part of the inventive sensing unit herein disclosed, the prior art (exemplified by U.S. Pat. No. 3,241,620) will readily suggest appropriate linkages and a control lever which may be interposed between the hydraulic link of this invention and the actuator unit of the tractor for utilizing the instant invention. Such linkages often provide for the capability to preset the desired deflection of the resilient means 31 whereby any change in the draft force exerted by the implement (which tends to alter the deflection of the resilient means 31) will actuate the valve or actuator unit of the tractor so as to vertically alter the position of the implement's ground-engaging tools to preclude any increase or decrease of the draft force, or any increase or decrease of the engine output requirement.

FIGS. 3 and 4 disclose the subject matter of the instant invention being incorporated into upper link 17 rather than the lower links 19, 19 as described in the first embodiment. The construction of the sensor unit 30 is again substantially identical to that previously disclosed except in this instance more Belleville washers are disposed rearwardly of abutment 33 than upon the forward side thereof. The reason for such is that an associated implement normally places the upper link 17 in compression while the lower links 19, 19 are normally in tension. However if the upper link should be placed in tension the Belleville washers on the forward side of abutment 33 are capable of resiliently opposing expansion of the chamber 43, any deflection again resulting in a signal or impulse to the receiving chamber 42. With more specific reference to FIG. 4 it should be clear that the signal-transmitting means 41 and the signal-receiving means 42 together with conduit 51 interconnecting the two chambers is merely a hydraulic link, such being true of the system disclosed in the first embodiment. A spring 60 may be utilized to pressurize the hydraulic link so as to insure accurate and immediate response within the system. Again, reference may be made to the previously identified patents and to the skill in the art for sufficient disclosures relating to appropriate control linkages to the activating unit to properly utilize the signal received by chamber 42 so as to provide a constant draft system.

It should be appreciated that any enclosed hydraulic link would function satisfactorily although the bellows units themselves may form the preferred system in terms of precluding fluid leakage from the chambers. Also a telescopic link member is herein utilized to house or carry the sensor unit although any linkage elements permitting relative movement between various parts thereof would be sufficient for incorporating the subject matter of this invention and finally it is submitted that any suitable resilient means may be employed in lieu of the Belleville washers.

In viewing the instant disclosure it should be apparent that the applicant has disclosed a novel and unique system of measuring the quantity of a force imposed upon a link member of the hitch and hydraulic linkage means for transmitting this force measurement to the power lift system of a tractor. It is quite inexpensive to manufacture and is readily capable of being attached to various points upon the tractor housing to accommodate various tire sizes and yet maintain the proper pulling point for the implement. Finally it should be appreciated that the system herein disclosed measures the draft force of an associated trail-behind appliance upon a tractor in a direct line thereby minimizing friction and precluding the transmission of such forces to various linkages to impose them upon the actuating unit for the power lift system of the tractor. Thus the several stated objects and other obvious advantages of the invention as aforestated are achieved and as exemplified by the fact that alternative resilient means which may be employed in lieu of the Belleville washers 31 it should be appreciated that the invention may be embodied in several forms without departing from the spirit or the essential characteristics of the instant invention.

I claim:

1. In a tractor having pivotal draft means for attachment of an implement thereto said draft means includes a telescopic section having an expandable chamber therein, a power lift unit for vertically raising and lowering the draft means and an actuator unit for controlling the power lift unit in response to forces acting on said hitch means, an improved force-sensing device for measuring the forces imposed on the hitch means and for transmitting a quantitative signal thereof to the actuator means, said sensing device comprising:

a. two-way force-resisting means carried by said draft means for resisting force imposed thereon in either direction parallel to said draft means, said two-way force-resisting means are disposed within said chamber for resiliently resisting telescopic movement of said element, and
   b. hydrostatic measuring means interconnecting said force-resisting means and said actuator unit and operable for transmitting the quantitative signal of the force to said actuator means as a function of deflection of said force-resisting means, said hydrostatic measuring means comprising: an expandable chamber containing hydraulic fluid disposed adjacent said resilient means for expanding and contracting upon telescopic movement of said draft means for transmitting a quantitative signal of said expansion or contraction to the actuator means.

2. In a tractor having pivotal draft means for attachment of an implement thereto said draft means includes a telescopic section having an expandable chamber therein, a power lift unit for vertically raising and lowering the draft means and an actuator unit for controlling the power lift unit in response to forces acting on said hitch means, an improved force-sensing device for measuring the forces imposed on the hitch means and for transmitting a quantitative signal thereof to the actuator means, said sensing device comprising:

a. two-way force-resisting means carried by said draft means for resisting force imposed thereon in either direction parallel to said draft means, said two-way force-resisting means are disposed within said chamber for resiliently resisting telescopic movement of said element,
   b. hydrostatic measuring means interconnecting said force-resisting means and said actuator unit and operable for transmitting the quantitative signal of the force to said actuator means as a function of deflection of said force resisting means, said hydrostatic measuring means comprising a resilient bellows unit.

3. A draft link for an agricultural vehicle comprising:

a. an elongated member,
   b. a force-resisting means interconnected intermediate the ends of said member for resiliently deflecting in response to a compressive or tensile force imposed upon said draft link, said force-resisting means comprises: a tubular member interconnected intermediate the ends of said elongated member permitting telescopic movement of the respective ends of said elongated member, and resilient means displaced in said tubular member for resiliently opposing any telescopic movement of said one end with respect to said tubular element, said telescopic connection is defined by: a fixed abutment within said tubular element, an anchoring means passing through said abutment and securely attached to one end of said draft link, and resilient members disposed upon either side of said abutment so as to resist telescopic movement in either direction due to external forces imposed upon said draft link, and c. hydraulic chamber means incorporated in said force resisting means being volumetrically responsive to movement thereof so as to measure the magnitude of a force imposed on said link.

4. A draft link for an agricultural vehicle comprising:

a. an elongated member, b. a force-resisting means interconnected intermediate the ends of said member for resiliently deflecting in response to a compressive or tensile force imposed upon said draft link, said force-resisting means comprises: a tubular member interconnected intermediate the ends of said elongated member permitting telescopic movement of the respective ends of said elongated member, and resilient means displaced in said tubular member for resiliently opposing any telescopic movement of said one end with respect to said tubular element, and c. hydraulic chamber means incorporated directly into the end of said elongated member and being volumetrically responsive to movement thereof so as to measure the magnitude of a force imposed on said link, said hydraulic chamber or means comprising a resilient bellows unit.

5. In a tractor having pivotal draft means for attachment of an implement thereto, a power lift unit for vertically raising and lowering the draft means and an actuator unit for controlling the power lift unit in response to forces acting on said draft means, said draft means includes a telescopic member having an expandable chamber therein, an improved force-sensing device for measuring the forces imposed on the draft means and for transmitting a quantitative signal thereof to the actuator means, said sensing device comprising:

a. two-way force-resisting means incorporated directly into said draft means for resisting force imposed thereon in either direction parallel to said draft means, said two-way force-resisting means are disposed within said member chamber for resiliently resisting telescopic movement of said draft element, and b. hydrostatic measuring means interconnecting said force-resisting means and said actuator unit and operable for transmitting a quantitative signal of the force to said actuator means as a function of deflection of said force-resisting means, said hydrostatic measuring means comprises an expandable chamber containing hydraulic fluid disposed within said member chamber adjacent said two-way means for transmitting a quantitative signal of expansion or contraction to the actuator means.

6. In a tractor having pivotal draft means for attachment of an implement thereto, a power lift unit for vertically raising and lowering the draft means and an actuator unit for controlling the power lift unit in response to forces acting on said draft means, an improved force-sensing device for measuring the forces imposed on the draft means and for transmitting a quantitative signal thereof to the actuator means, said sensing device comprising:

a. two-way force-resisting means incorporated directly into said draft means for resisting force imposed thereon in either direction parallel to said draft means, and b. hydrostatic measuring means interconnecting said force-resisting means and said actuator unit and operable for transmitting a quantitative signal of the force to said actuator means as a function of deflection of said force-resisting means, said hydrostatic measuring means comprising a bellows unit.

7. In a tractor having an elongated hitch means, a power lift unit for vertically raising and lowering the hitch means, an actuator unit for controlling the power lift unit in response to forces acting on the hitch means, an improved force-sensing device for measuring the forces imposed on the hitch means and for transmitting a quantitative signal thereof to the actuator means, said sensing device comprising:

a. force-resisting resilient means incorporated directly into said hitch means, said force-resisting resilient means comprising: a tubular member incorporated directly into the end of an element of the hitch means, said incorporation permitting relative movement between the two ends of said hitch means, and resilient means within said tubular member arranged and adapted to resist relative movement of the hitch means in either direction, and b. a hydrostatic link interconnected between said resilient means and said actuator means for transmitting a quantitative signal of said force applied by an associated implement to the actuator means whereby the hitch means is vertically raised and lowered in response to the magnitude of the external force.

8. In a tractor having an elongated hitch means, a power lift unit for vertically raising and lowering the hitch means, an actuator unit for controlling the power lift unit in response to forces acting on the hitch means, an improved force-sensing device for measuring the forces imposed on the hitch means and for transmitting a quantitative signal thereof to the actuator means, said sensing device comprising:

a. force-resisting resilient means incorporated directly into said hitch means, said force-resisting resilient means comprising: a tubular member incorporated directly into the end of an element of the hitch means, said incorporation permitting relative movement between the two ends of said hitch means, and resilient means within said tubular member arranged and adapted to resist relative movement of the hitch means in either direction, and b. a hydrostatic link interconnected between said resilient means and said actuator means for transmitting a quantitative signal of said force applied by an associated implement to the actuator means whereby the hitch means is vertically raised and lowered in response to the magnitude of the external force, said hydrostatic link means comprising: a chamber within said tubular element adapted to expand and contract in relation to relative movement between the two ends of the hitch elements, a chamber means connected with said actuator means which expands and contracts upon the opposite movement of said chamber within said tubular element, and a conduit interconnecting said tubular element chamber and actuator chambers for transmitting relative movement of the hitch.

9. A draft link for an agricultural vehicle comprising:

a. an elongated member, b. a two-way force-resisting means incorporated directly into the end of said elongated member for resiliently deflecting a compressive or tensile force imposed upon said elongated member, said force-resisting means comprising: a tubular member interconnected intermediate the ends of said elongated member accommodating telescopic movement of the respective ends of said elongated member, and resilient means displaced in said tubular member for resiliently opposing any telescopic movement of said elongated member with respect to said tubular element, and c. hydraulic chamber means incorporated directly into the end of said elongated member and being volumetrically responsive to movement thereof so as to measure the magnitude of a force imposed on said link.

10. A draft link for an agricultural vehicle comprising:

a. an elongated member, b. a two-way force-resisting means incorporated directly into the end of said elongated member for resiliently deflecting a compressive or tensile force imposed upon said elongated member, said force-resisting means comprising: a tubular member interconnected intermediate the ends of said elongated member accommodating telescopic movement of the respective ends of said elongated member, and resilient means displaced in said tubular member for resiliently opposing any telescopic movement of said elongated member with respect to said tubular element, said telescopic connection being defined by: being a fixed abutment within said tubular element, an anchoring means passing through said abutment and securely attached to one end of said draft link, and resilient members disposed upon either side of said abutment so as to resist telescopic movement in either direction due to external forces imposed upon said draft link, and c. hydraulic chamber means incorporated directly into the end of said elongated member and being volumetrically responsive to movement thereof so as to measure the magnitude of a force imposed on said link.

11. A draft link for an agricultural vehicle comprising:
a. an elongated member,
b. a two-way force-resisting means incorporated directly into the end of said elongated member for resiliently deflecting a compressive or tensile force imposed upon said elongated member, said force-resisting means comprising: a tubular member interconnected intermediate the ends of said elongated member accommodating telescopic movement of the respective ends of said elongated member, and resilient means displaced in said tubular member for resiliently opposing any telescopic movement of said elongated member with respect to said tubular element, and
c. hydraulic chamber means incorporated directly into the end of said elongated member and being volumetrically responsive to movement thereof so as to measure the magnitude of a force imposed on said link, said hydraulic chamber means comprising a resilient bellows unit.

* * * * *

PO-1050
(5/69)

UNITED STATES PATENT OFFICE
CERTIFICATE OF CORRECTION

Patent No. 3,628,610         Dated December 21, 1971

Inventor(s) James Morkoski

It is certified that error appears in the above-identified patent and that said Letters Patent are hereby corrected as shown below:

Column 4, lines 19, 20, 43 and 44, the word "hitch" should read --draft--.

Signed and sealed this 15th day of August 1972.

(SEAL)
Attest:

EDWARD M.FLETCHER,JR.              ROBERT GOTTSCHALK
Attesting Officer                  Commissioner of Patents